United States Patent [19]

Streiffert et al.

[11] 3,731,006

[45] May 1, 1973

[54] DEVICE FOR SELECTIVELY REPRODUCING SOUND ON ONE OF A PLURALITY OF TRACKS

[75] Inventors: John G. Streiffert; Edward Muka, both of Rochester, N.Y.

[73] Assignee: Eastman Kodak Company, Rochester, N.Y.

[22] Filed: June 7, 1971

[21] Appl. No.: 150,698

[52] U.S. Cl. .....179/100.2 MD, 179/100.2 T, 274/4 J

[51] Int. Cl. .........................G11b 21/12, G11b 21/04

[58] Field of Search ...........................179/100.2 MD; 340/174.1 C; 35/35; 274/4 J, 4 R

[56] References Cited

UNITED STATES PATENTS

| | | | |
|---|---|---|---|
| 3,187,316 | 6/1965 | Johnson | 340/174.1 C |
| 2,998,494 | 8/1961 | Nations | 179/100.2 T |
| 3,514,770 | 5/1970 | Parken | 179/100.2 T |
| 2,650,830 | 1/1953 | Potter | 274/4 R |
| 2,603,006 | 7/1952 | MacChesney | 274/4 J |
| 3,291,920 | 12/1966 | Hauser | 179/100.2 T |
| 3,093,436 | 6/1963 | Merli | 274/4 J |

*Primary Examiner*—Bernard Konick
*Assistant Examiner*—Jay P. Lucas
*Attorney*—Robert W. Hampton, Paul R. Holmes and Lloyd F. Seebach

[57] ABSTRACT

Reproducing apparatus comprises a device for selectively positioning a transducer head with respect to a selected one of a plurality of tracks on either of two opposed planar surfaces of a record medium and for rendering operative the transducer head associated with the selected track for reproducing information thereon.

17 Claims, 8 Drawing Figures

JOHN G. STREIFFERT
EDWARD MUKA
INVENTOR.

BY Lloyd J. Seebach

AGENT

JOHN G. STREIFFERT
EDWARD MUKA
INVENTOR.

BY Lloyd F. Seebach

AGENT

JOHN G. STREIFFERT
EDWARD MUKA
INVENTOR.

BY Lloyd J. Seetoch
AGENT

JOHN G. STREIFFERT
EDWARD MUKA
INVENTOR.

BY Lloyd F. Seebach

AGENT

JOHN G. STREIFFERT
EDWARD MUKA
INVENTOR.

BY Lloyd F. Seebach

AGENT

DEVICE FOR SELECTIVELY REPRODUCING SOUND ON ONE OF A PLURALITY OF TRACKS

FIELD OF THE INVENTION

The invention relates to reproducing apparatus and, more particularly, to a device for selectively positioning a transducer head with respect to a selected one of a plurality of tracks on either of two opposed planar surfaces of a record medium and for rendering operative the transducer head associated with the selected track for reproducing information thereon.

DESCRIPTION OF THE PRIOR ART

The prior art discloses that it is well-known to utilize visual and/or audio information on a transparent or an opaque record medium that can be readily inserted and used in conjunction with a device, such as a programmed film projector. In many instances, the record medium is provided with only a single sound track and, in some instances, the transducer head is moved relative to the medium. In such disclosures, quite complex mechanisms are required to disengage the transducer head from the record medium at the end of the run relative to the sound track so as to return the head to its original position for operation with respect to the sound track on the next medium that might be inserted in the apparatus. The prior art also discloses a form of record medium having information-bearing tracks on opposite surfaces thereof and in which a transducer head associated with each surface or side is selectively operable to reproduce with respect to the track on a respective surface. As pointed out hereinabove, the mechanisms required are quite complex for controlling the movement of the transducer head, particularly, when a zig-zag (continuous) track is used, or when the sound track is one that requires continuous movement of the head with respect to the medium in both directions and in synchronism with movement of the medium so as to position each respective sound track relative to the head.

SUMMARY OF THE INVENTION

One object of this invention is to provide a device for selectively reproducing information recorded in any of a plurality of parallel tracks on both surfaces or sides of a record medium.

Another object of this invention is to provide a device for use with a record medium having spaced, parallel sound tracks on each of two opposed surfaces thereof wherein either of two transducer heads associated with the sound tracks on the respective surfaces of the record medium can be moved into operative relation to any preselected sound track.

Still another object of the invention is to provide a device for supporting a record medium during movement thereof between a set of spaced, transducer heads.

A further object of the invention is to provide a device for rapidly positioning a transducer head relative to a preselected sound track on a record medium and which has a short recycling time for positioning the head relative to another preselected track.

Yet another object of the invention is to provide a device for moving in one direction by a positive drive a record medium having a plurality of spaced, parallel sound tracks and in the other direction by biasing means and gravity.

Still another object of the invention is to provide a device in which a frame member supports a record medium for movement within a casing so the record medium is inaccessible to an operator while information is being reproduced and positively drives the record medium into a position in which it can be removed from or inserted into the frame member.

Further objects and advantages of the invention will be apparent to those skilled in the art by the description which follows.

The above objects and advantages of the invention are attained by a device that is arranged at an angle to the horizontal to permit movement of a carrier for a record medium in one direction by a biasing means and gravity. The carrier supports the record medium during movement in a plane at an angle to the horizontal and between a pair of transducer heads. The transducer heads are mounted relative to the medium so as to be readily adjustable with respect to the medium with which they engage the medium as well as with respect to the sound tracks on the medium for proper orientation therewith. The transducer heads are normally disengaged from the record medium and are moved transversely thereof as a unit to position them with respect to the selected track position. When in this position, the heads are moved into engagement with the record medium simultaneously with movement of the medium relative to the heads. The carrier for the record medium controls the length of travel of the carrier and upon tripping a limit switch the carrier drive is released, the heads are disengaged from the medium and the carrier returns to its normal "home" position. Inasmuch as the record medium is in contact with both heads during movement, although only the head associated with the selected track is operative, the heads also serve to provide additional support for the record medium during its movement, thereby providing better sound reproduction.

DESCRIPTION OF THE DRAWINGS

Reference is now made to the accompanying drawings wherein like reference numerals and characters designate like parts and wherein.

DESCRIPTION OF THE PREFERRED EMBODIMENT

Figure 1:
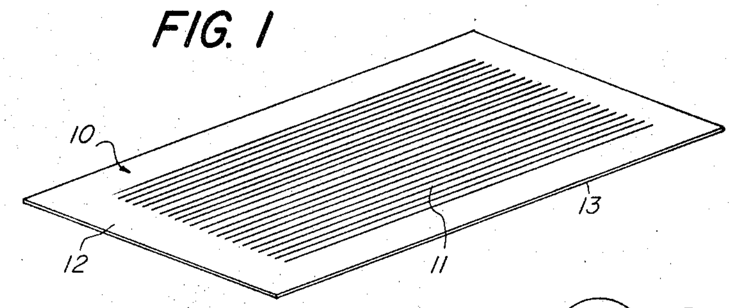
FIG. 1 is a perspective view showing the format of a representative record medium.

With reference particularly to FIG. 1, a record medium 10 is shown as comprising a support, for example, a sheet of paper, cardboard, film, glass, plastic, or a similar material on which a plurality of sound tracks 11 can be formed by providing a suitable coating of magnetic material or the like. In the present invention, the sound tracks 11 are formed on both surfaces 12 and 13 of the medium 10, the tracks on one surface being generally aligned with those on the other surfaces so a set of transducer heads 14 and 15 can be arranged relative to the sound tracks on each surface and movable as a unit so as to be aligned with a respective track on each surface. While the invention is directed to the reproduction of sound recorded on tracks 11, sound, digital data or other information can be recorded in each track, the heads 14 and 15 then being used in conjunction with suitable information decoding circuitry. The term "reproducing" as used herein and in the appended claims is meant to include recording as well as play back or pick-up as used in this art.

Figure 4:
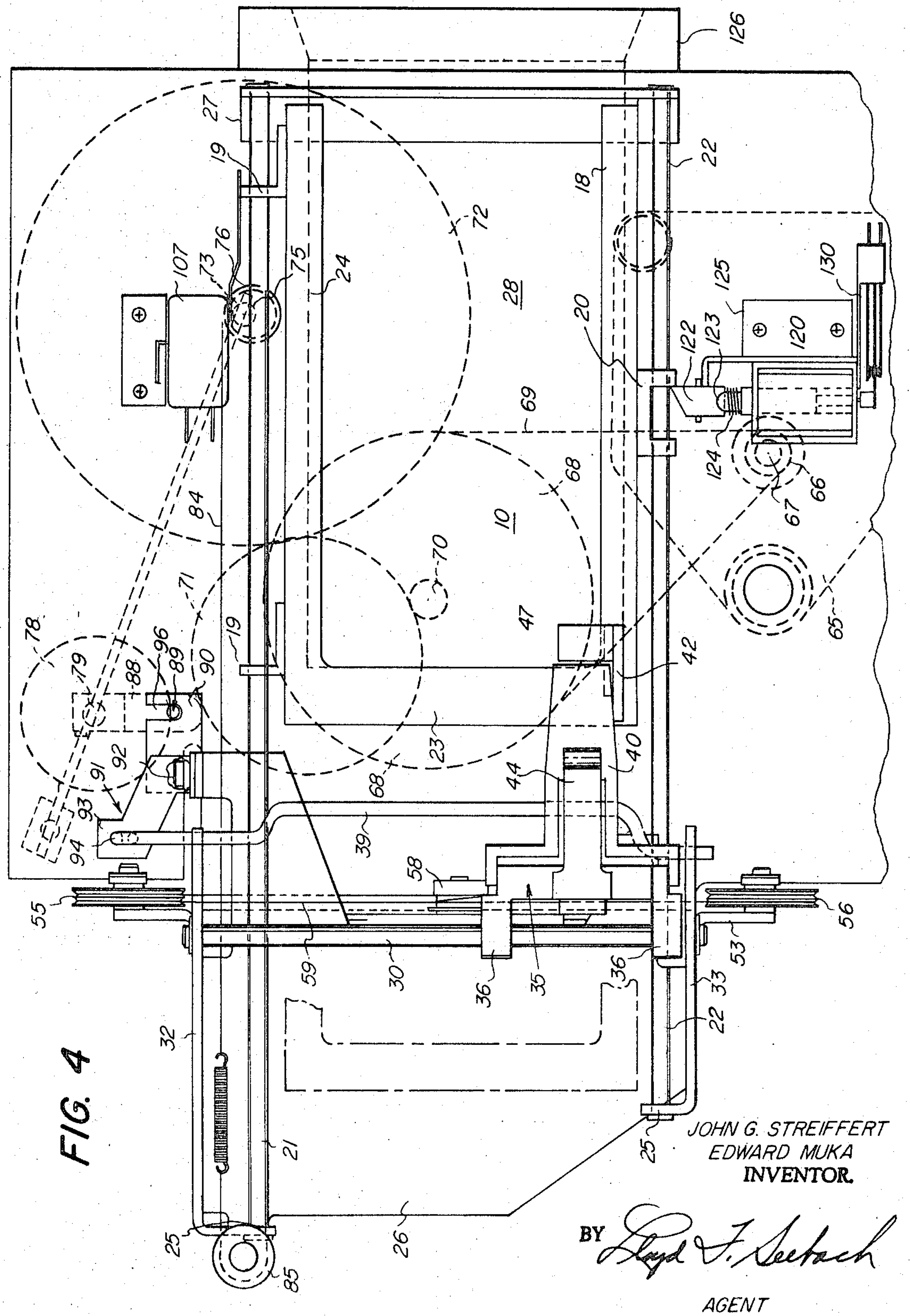
FIG. 4 is a plan view showing the relation of the record medium to the transducer head and the drive mechanism for moving the carrier and transducer heads.

As shown in FIG. 4, the record medium 10 is insertable in a frame member 18 which is generally U-shape in form and provided with brackets 19 on one side thereof and a bracket 20 on the other side by which the frame is supported on the rods 21 and 22 for a purpose to be described hereinafter. It will be noted that one end of the record medium 10 extends beyond the frame member 18, and the other end is spaced inward from the cross bar 23 of frame member 18 to permit the full length of medium 10 to be moved relative to the transducer heads 14 and 15. The frame member 18 is provided with grooves 24 in which the record medium 10 can be inserted and withdrawn.

The means for supporting and guiding the frame member 18 comprises the brackets 19 and 20 and rods 21 and 22, the latter being mounted in spaced extensions 25 on a plate member 26 and spaced extensions 27 which are mounted on a plate 28. With respect to FIG. 3, it will be noted that the plate member 26 is also mounted on plate 28.

The means for supporting each of the transducer heads 14 and 15 in a position relative to the record medium 10 comprises a rod 30 on which the head 14 is movable and a rod 31 on which the head 15 is movable. These rods are mounted in spaced, parallel relationship in the side walls 32 and 33 that are formed integral with the plate member 26. Heads 14 and 15 are mounted in substantially the same way on their respective rod 30 or 31 and such mounting means will therefore be described only with respect to the head 14.

Figure 6:
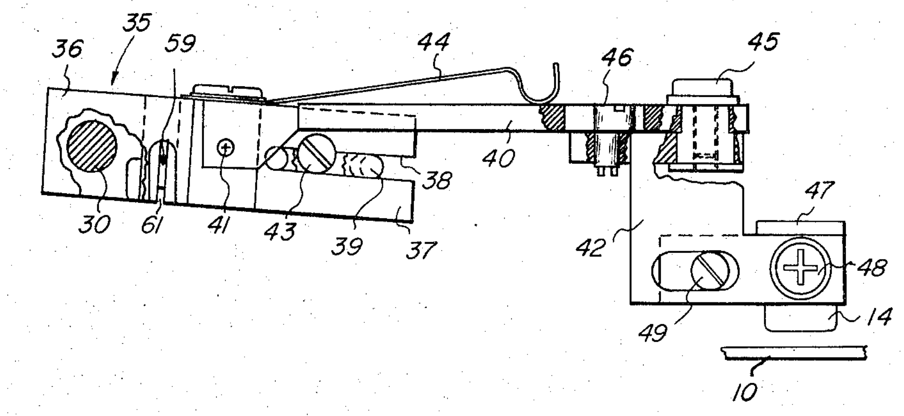
FIG. 6 is a detail, side elevational view of the supporting and guiding means for the transducer heads.

A slide member 35 is provided with spaced bearings 36 for operably and slideably engaging the rod 30. A tongue portion 37 extends intermediate bearings 36 and is provided with a slot 38 through which an actuating rod 39 extends for a purpose to be described hereinafter. A yoke member 40 is pivotally mounted on slide member 35 at 41 and at the opposite end carries a bracket 42 on which head bracket 47 is mounted. Tongue portion 37 carries an eccentric screw 43, the head of which engages the under surface of yoke member 40, as shown in detail in FIG. 6. A leaf spring 44 is mounted on slide member 35 and the free end thereof engages yoke member 40 near the overhanging end thereof. By adjusting (turning) screw 43, the override of slide member 35 relative to yoke member 40 can be adjusted, thereby insuring proper clearance between the head 14 and the record medium 10 in the disengaged position. The bracket 42 is pivotally mounted on yoke member 40 at 45 and an eccentric stud 46 carried thereby engages yoke member 40 as the position of bracket 42 can be adjusted in a generally horizontal direction, as viewed in FIG. 6, so as to accurately position the head 14 relative to the sound tracks. The bracket 47 on which head 14 is mounted is also pivotally mounted on bracket 42 at 48 and by means of an eccentric stud 49, the angular position of head 14 in a vertical plane, as viewed in FIG. 6, can be adjusted so as to position the head normal to the plane of record medium 10.

Figure 5:
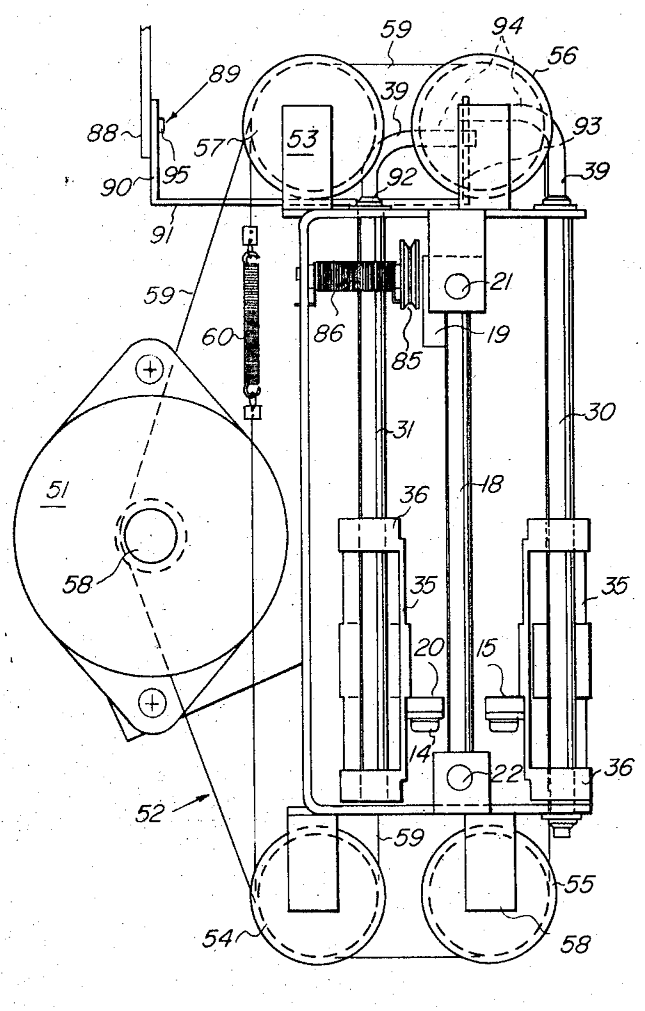
FIG. 5 is an end view showing the drive mechanism for moving the transducer heads transversely of the record medium.

The means for intermittently moving the heads 14 and 15 transverselv of the record medium 10 comprises a stepping motor 51 and a cable drive 52 associated therewith. The side walls 32 and 33 of plate member 26 carry a number of extensions or bearing members 53, each of which rotatably supports one of pulleys 54, 55, 56, and 57, as shown in FIG. 5. The stepping motor 51 is also provided with a pulley 58. In order to more clearly understand the cable drive 52, reference should be made to FIGS. 3 and 5. The pulleys 54–57 are provided with two grooves to form a path of movement for a cable 59 which is as follows: Starting at the lower end of a spring 60, as viewed in FIG. 5, a cable 59, attached at one end to spring 60, passes around the upper groove of pulley 54, through a slot 61 in the lower slide member 35 by means of which the cable 59 is secured to member 35, see FIG. 6, around the upper groove of pulley 57 and then wraps around pulley 58 on stepping motor 51. From pulley 58, the cable 59 extends around the lower groove of pulley 54, the upper groove of pulley 55, through the slot 61 in the upper slide member 35, and then around the upper groove of pulley 56 and the lower groove in pulley 57 to the other end of spring 60. With this arrangement, if it is assumed that the pulley 58 is rotated by motor 51 in a counterclockwise direction, then the heads 14 and 15 will be moved as a unit in an upward direction, as viewed in FIG. 5, which is transversely of the record medium 10. During such movement the heads 14 and 15 are disengaged from the respective surfaces 12 and 13 of record medium 10.

The drive means for moving the record medium 10 between a first position in which one of the sound tracks 11 is positioned relative to the heads 14 and 15 and a second position in which the other end of the sound tracks is positioned relative to the heads comprises a motor 65 that is continuously energized when the apparatus is operative, so that the movement of record medium 10 can be accomplished at any time. The motor 65 is mounted on the underside of plate 28 and drives a pulley 66 secured to its shaft 67. The pulley 66 is interconnected to a pulley 68 by a belt 69 thereby rotating a small roller 70 associated with pulley 68 and which frictionally engages a rubber roller 71 which, in turn, engages a fly wheel 72 rotatably mounted on an axially movable shaft 73. A clutch means 74 provides for imparting the rotation of shaft 73 to shaft 75 on which a pulley 76 is fixedly mounted.

Figure 3:
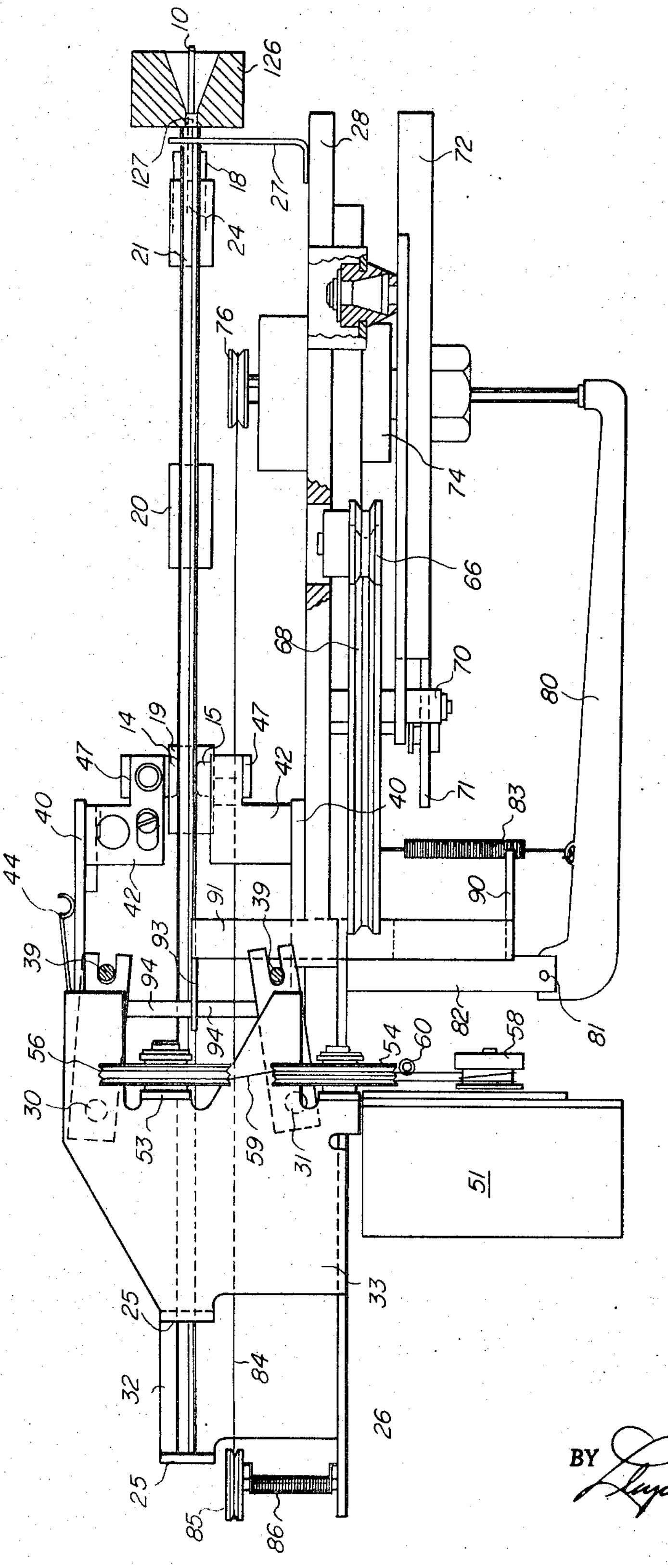
FIG. 3 is a side elevational view showing the mechanism by which the record medium and transducer heads are moved.
Figure 7:
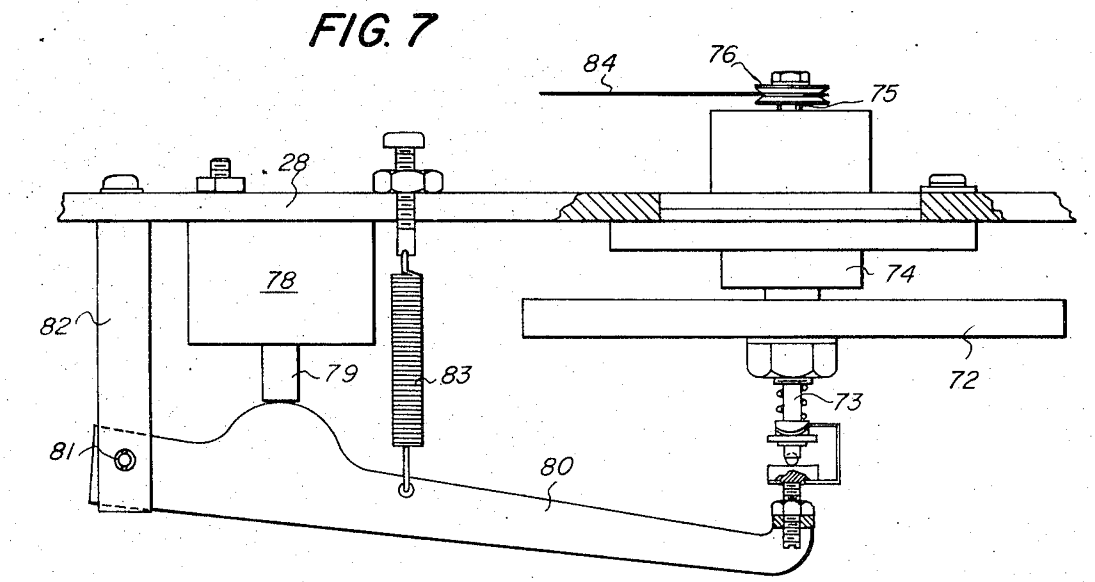
FIG. 7 is a detail, side elevational view showing the mechanism by which the drive means for the carrier and the transducer heads are actuated.

In a manner to be described in more detail hereinafter, a solenoid 78 is energized when the heads 14 and 15 are positioned relative to the selected sound track. With energization of solenoid 78, the armature 79 permits a lever 80 to move in a counterclockwise direction about its pivot 81 which, as shown in FIG. 7, is pivotally mounted on post 82 that extends from the underside of plate 28. The lever 80 is maintained in engagement with the armature 79 and moved in said direction by a spring 83. As the armature 79 moves inward, upon energization of solenoid 78, the lever 80 is moved in a counterclockwise direction by spring 83. This movement causes shaft 73 to be moved axially and the clutch means 74 is then engaged, thereby imparting the rotation of shaft 73 to shaft 75 and rotating pulley 76. A cable 84 is connected to frame member 18 and encircles pulley 76 and a pulley 85, which is mounted on plate member 26 and biased by a spring 86, as shown in FIG. 3. The carrier or frame member 18 is, therefore, moved along rods 21 and 22 at a uniform rate and relative to the transducer heads 14 and 15. During such movement, spring 86 that is connected between pulley 85 and plate 26 is wound up to bias pulley 85.

Solenoid 78 is capable of providing rotary movement of armature 79 as well as axial movement. The armature 79 of solenoid 78 carries a lever 88 that is pivotally connected at 89 to an extension 90 of a lever 91 that, in turn, is pivotally mounted at 92 on plate 28 and pivotally connected via extension 93 to the respective ends 94 of the actuating rods 39, see FIG. 5. This linkage of levers can be best seen with respect to FIGS. 4 and 5. The pivot at 89 comprises a pin and slot connecting, the pin 95 being carried by lever 88 and the extension 90 having a slot 96. The lever 91, as seen in FIG. 4, is moved in a counterclockwise direction about pivot 92 to move the heads 14 and 15 into an engaging position with respect to record medium 10. By the same token, movement of lever 91 in a clockwise direction disengages the heads 14 and 15 from the record medium 10. It will be evident from FIGS. 3, 4 and 5 that the movement of lever 91 actuates the rods 39 simultaneously so that, upon energization of solenoid 78, the heads 14 and 15 are moved into position for engaging record medium 10 simultaneously with the movement of record medium 10 relative to the heads. The heads 14 and 15 also serve to support the record medium 10 during its movement relative thereto and with such support improved reproduction is attained.

Figure 8:
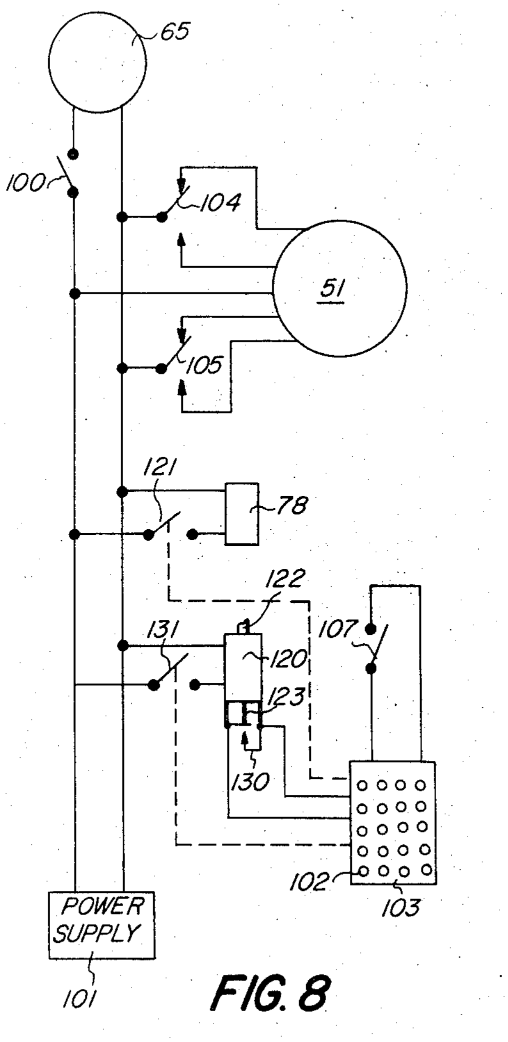
FIG. 8 is a schematic wiring diagram for controlling the selection of the transducer head and sound track to be rendered operable and for controlling the operation of the drive means for the carrier and transducer heads.
Figure 2:
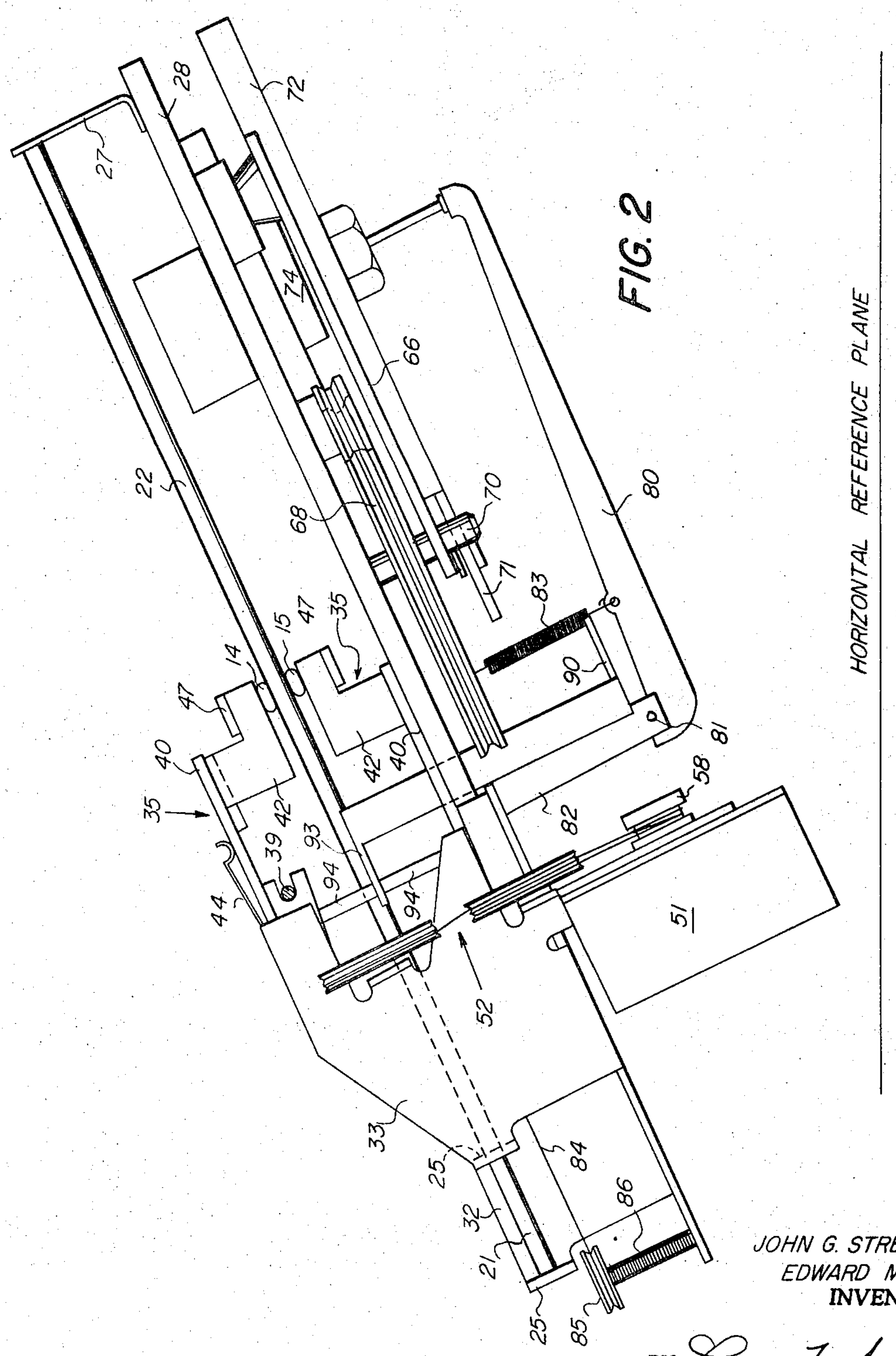
FIG. 2 is a side elevational view of the record medium transport device showing the relation of the mechanism to the horizontal plane for utilizing gravity as means for moving the record medium in one direction.

The operation of the device comprising the invention can be best understood by the following description in connection with the schematic diagram shown in FIG. 8. The motor 65 is continuously energized with the closing of switch 100 by power supply 101, so that the device is then operative merely upon selection of the track and associated transducer head to be made operative. When selection of any track is made in accordance with the actuation of one of the buttons 102 on controller 103, a signal is presented which energizes either switch 104 or 105 associated with stepping motor 51 in accordance with the necessary direction of rotation to locate the selected track. The motor 51 imparts small increments of movement to pulley 58 and via the cable 59, the upper and lower slide members 35 are moved as a unit transversely of the record medium 10. It should be pointed out that it is understood that a record medium 10 has been inserted in frame member 18 prior to making the track and head selection. When the heads 14 and 15 are properly aligned with the selected track, a signal is generated which causes solenoid 78 to be energized. As a result, lever 88 causes lever 91 to rotate rods 39 and move the heads 14 and 15 into engagement with the record medium 10. At the same time, the armature 79 permits lever 80 to be moved by spring 83 into a position in which clutch means 74 is engaged, thereby causing pulley 76 to rotate and move frame member 18 along rods 21 and 22 at uniform rate. When the other end of the tracks on record medium 10 are adjacent or under heads 14 and 15, the forward bracket 19 engages the arm of a limit switch 107 which signals controller 103 that the end of a track has been reached. Then controller 103 opens switch 121 which breaks the circuit to the solenoid 78. When this occurs, the lever 91 returns the heads 14 and 15 to their disengaged positions and the lever 80 releases clutch means 74 so the frame member 18 is free to be moved by spring 86 and the force of gravity due to the inclination of the entire device to a "home" or first position wherein the forward end of the tracks on record medium 10 are adjacent or under heads 14 and 15.

The record medium 10 can be removed from or inserted into the grooves 24 in frame member 18 as follows. Upon a "load" command from selector 103, solenoid 78 is energized by the closing of switch 121 which initiates a regular "reproduce" cycle. However, the controller 103 does not select either head 14 or head 15 so they maintain silence. The signal derived from limit switch 107 as it is actuated by the bracket 19 is also disregarded. Since throat 127 in casing 126 is generally aligned with grooves 24 the record medium 10 can be moved to a position in which it extends outside of casing 126 and is, therefore, available for removal by the operator. Previous to this operation the limit switch 107 indicated to the controller 103 that the record medium 10 is within the casing 126 and, hence, is inaccessible to the operator. The record medium 10 is moved out of casing 126 to the extent or until bracket 20 is latched by a latching cam 122 associated with the plunger 123 of solenoid 120. Solenoid 120 is mounted on bracket member 125 which, in turn, is fixed to plate 28. The end of solenoid plunger 123 that is opposite the latching cam 122 actuates switch 130 and a spring 124 normally urges the solenoid plunger 123 in an upward direction or toward the bracket 20 as viewed in FIG. 4. When the bracket 20 is driven past latching cam 122 the record medium 10 extends beyond the throat 127 a sufficient distance so that it can be grasped by the operator. The bracket 20 forces latching cam 122 downward thereby actuating switch 130. The signal generated by switch 130 indicates to controller 103 that latching cam 122 is in its lower position and driving or movement of frame member 18 continues until latching cam 122 is urged behind the right leg of bracket 20. When this occurs, switch 130 opens and provides a signal to controller 103 that the plunger 123 has returned to its latching position; and with this signal, switch 121 is opened thereby de-energizing solenoid 78. The record medium 10 is now in its extended position with respect to casing 126 so it can be removed by the operator and a new record medium inserted therein. When a new record medium 10 is inserted, the controller 103 is momentarily energizes switch 131 which, in turn, energizes solenoid 120 so latching cam 122 is withdrawn from bracket 20 and the frame member 18 is then moved by gravity and the biasing force of spring 86 to the "home" position.

The controller 103 includes circuitry for associating one of the heads 14 or 15 with the selected track and renders the head operative for reproduction when its positioned in engagement with the record medium. Controller 103 can also include circuitry for remembering the position of heads 14 and 15 to the direction of movement of the heads can be immediately ascertained with the next selection that is made. In another version of such a controller, the heads 14 and 15 can always be returned to a designated track upon completion of a run along a selected track so the movement of the heads is always in the same direction for locating relative to a newly selected track. In any event controller 103 serves as means for locating the heads relative to any selected track.

This invention has been described in detail with particular reference to preferred embodiments thereof, but it will be understood that variations and modifications can be effected within the spirit and scope of the invention.

We claim:

1. A device including a pair of spaced and generally aligned transducer heads for selectively reproducing information in a plurality of spaced, parallel tracks extending longitudinally on the opposed surfaces of a record medium selectively positioned therebetween, the tracks on one surface being generally aligned with those on the other surface in accordance with the alignment of the transducer heads, said device comprising:
 - a movable carrier for releasably supporting the record medium in a plane between and spaced from the transducer heads;
 - first means for supporting the carrier for movement in the plane in a direction parallel to the tracks on the record medium;
 - second means mounted relative to each side of the carrier for supporting each of the transducer heads in a position disengaged from the record medium for movement relative to and transversely of the tracks on the respectively opposed surfaces of the record medium;
 - third means operatively associated with the second means for simultaneously moving the transducer heads transversely of the tracks on the record medium to position the transducer heads in relation to a selected track;
 - fourth means operatively associated with the second means, when the transducer heads are positioned relative to the selected track, for moving the transducer heads simultaneously into reproducing engagement with tracks on the respectively opposed surfaces of the record medium;
 - drive means for moving the carrier between a first position in which the transducer heads are adjacent one end of the tracks on the respectively opposed surface of the record medium and a second position in which the transducer heads are adjacent the other end of the tracks;
 - fifth means responsive to the selection of a track on the respectively opposed surfaces of the recording medium for initiating the third means to position the transducer heads adjacent to the selected track and for rendering operative for reproducing the transducer head moved into engagement with the selected track;
 - sixth means responsive to the positioning of the transducer heads by said third means for generating an operating signal; and
 - seventh means responsive to the operating signal for initiating the fourth means and the drive means, whereby the record medium is moved relative to the one transducer head for reproducing the information on the selected track.

2. A device in accordance with claim 1 wherein the drive means is coupled to the carrier by clutch means and a cable drive connected to the carrier.

3. A device in accordance with claim 1, wherein the carrier is slideably mounted on the carrier supporting means.

4. A device in accordance with claim 1 wherein the transducer heads moving means comprises a stepping motor and a cable drive interconnecting the motor to the transducer heads.

5. A device in accordance with claim 1 wherein the means responsive to the operating signal comprises a solenoid operatively connected to the drive means and to the transducer heads moving means.

6. A device in accordance with claim 1 including means actuated by the carrier, when the carrier is in the second position, for decoupling the drive means and the fifth means whereby the carrier returns to the first position and the transducer heads are moved to the disengaged position.

7. A device in accordance with claim 6 wherein the carrier and the transducer heads moving means are moved into the second position and the engaged position, respectively, counter to resilient biasing means for returning each to its respective first and disengaged positions.

8. A device in accordance with claim 1, wherein the carrier comprises a frame which engages at least one set of opposite edges of the record medium for supporting the same and is positively moved in one direction in said plane by the drive means and in the other direction by gravity and resiliently biased means.

9. A device in accordance with claim 8, wherein the carrier supporting means comprises a member for supporting a pair of spaced, parallel rods on which the frame is slideably mounted.

10. A device in accordance with claim 1, wherein the transducer head supporting means comprises a cantilever member pivotally mounted with respect to each side of the carrier for movement toward and away from the record medium and slideably mounted for movement transversely of the record medium.

11. A device in accordance with claim 10 wherein each of the cantilever members comprises a first pivotal member, a second member pivotally mounted on the first member and a transducer head supporting member pivotally mounted on said second member, and including means carried by the first member and engaging the second member for controlling the pressure with which the transducer head engages the record medium.

12. A device in accordance with claim 11 wherein the second member and the transducer head supporting member include means for adjusting its respective transducer head laterally relative to the longitudinal direction of the tracks and relative to the plane of the record medium.

13. A device in accordance with claim 11 wherein the transducer heads moving means comprises a stepping motor and a cable drive interconnecting the motor and each of the first pivotal members.

14. A device in accordance with claim 11 wherein the transducer heads moving means comprising a linkage engaging each of the first pivotal members.

15. A device in accordance with claim 14 wherein the transducer heads moving means comprises a solenoid operatively connected to the linkage and to clutch means for coupling the drive means to the carrier.

16. A device including a pair of spaced and generally aligned transducer heads for selectively reproducing information on the opposed planar surfaces of a record medium in a plurality of spaced, parallel and longitudinally extending tracks, the tracks on one surface being generally aligned with those on the other surface in accordance with the alignment of the transducer heads, comprising:

a movable carrier for releasably supporting the record medium in a plane between and spaced from the transducer heads;

means for supporting and guiding said carrier during movement thereof in said plane;

means slideably mounted on and arranged relative to the supporting and guiding means on each side of the carrier for supporting a transducer head in a position disengaged from the record medium for movement relative to and transversely of the carrier;

means operatively coupled to the supporting means for the transducer heads for intermittently moving the transducer heads as a unit transversely of the record medium;

means operatively coupled to the supporting means for the transducer heads for simultaneously moving the transducer heads from the disengaged position into a position in which the transducer heads engage the record medium during movement thereof and for retaining the transducer heads in the engaged position to support the record medium;

drive means selectively coupleable to the carrier for moving the record medium between a first position in which one end of the tracks is positioned relative to the transducer heads and a second position in which the other end of the tracks is positioned relative to the transducer heads;

means for establishing selection of one of the tracks on one of the surfaces and the respective transducer head associated therewith;

means responsive to the selecting means for initiating the transducer heads moving means to position the latter relative to the selected track;

means responsive to the initiating means, when the transducer heads are in position relative to the selected track, for generating an operating signal; and means responsive to the operating signal for initiating the transducer heads moving and retaining means to move the heads from the disengaged position into an engaged position with respect to the record medium and for coupling the drive means to the carrier for moving the record medium relative to the transducer heads.

17. A device in accordance with claim 16 including means actuated by the carrier, when the carrier is in the second position, for decoupling the drive means and the transducer heads moving and retaining means, whereby the carrier returns to the first position and the transducer heads are moved to the disengaged position by resilient biasing means.

* * * * *